(12) United States Patent
Stoeckel et al.

(10) Patent No.: US 8,632,050 B2
(45) Date of Patent: Jan. 21, 2014

(54) ELECTROMAGNETIC ACTUATING UNIT (75) Inventors: Herbert Stoeckel, Graefenberg (DE);
Peter Stegmann, Nuremberg (DE); Jens Hoppe, Erlangen (DE); Andreas Kufner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 723 days.

(21) Appl. No.: 12/672,034

(22) PCT Filed: Jul. 4, 2008

(86) PCT No.: PCT/EP2008/058667
§ 371 (c)(1),
(2), (4) Date: Sep. 3, 2010

(87) PCT Pub. No.: WO2009/019089
PCT Pub. Date: Feb. 12, 2009

(65) Prior Publication Data
US 2011/0121214 A1 May 26, 2011

(30) Foreign Application Priority Data

Aug. 4, 2007 (DE) .......................... 10 2007 036 925

(51) Int. Cl.
*F16K 31/02* (2006.01)
(52) U.S. Cl.
USPC ....... 251/129.15; 251/214; 277/650; 335/260
(58) Field of Classification Search
USPC ........... 251/129.01, 129.15, 214; 137/625.65, 137/554; 277/650; 335/260
See application file for complete search history.

(56) References Cited

U.S. PATENT DOCUMENTS

| 4,020,803 | A | * | 5/1977 | Thuren et al. | 123/275 |
| 4,187,987 | A | * | 2/1980 | Raue | 239/533.4 |
| 4,719,943 | A | * | 1/1988 | Perach | 137/625.65 |
| 5,027,303 | A | | 6/1991 | Witte | |
| 5,186,210 | A | * | 2/1993 | Guasch | 137/596.17 |
| 5,449,227 | A | * | 9/1995 | Steinberg et al. | 303/119.2 |
| 6,390,117 | B2 | * | 5/2002 | Zapf | 137/15.21 |
| 7,611,121 | B2 | * | 11/2009 | Iwa et al. | 251/129.15 |
| 2009/0302250 | A1 | * | 12/2009 | Ho | 251/129.15 |
| 2011/0248103 | A1 | * | 10/2011 | Shafer et al. | 239/585.1 |

FOREIGN PATENT DOCUMENTS

| DE | 31 03 259 A | 8/1982 |
| DE | 37 22 728 A | 12/1988 |
| DE | 10 2005 052 445 A | 5/2007 |
| EP | 0 765 804 A | 4/1997 |

* cited by examiner

*Primary Examiner* — John K Fristoe, Jr.
*Assistant Examiner* — Marina Tietjen
(74) *Attorney, Agent, or Firm* — Lucas & Mercanti, LLP (57) ABSTRACT

An electromagnetic actuating unit for a hydraulic valve with a housing and a closure element. The housing at least partially delimits the electromagnetic actuating unit in relation to the surroundings. The closure element is arranged within an introductory opening of the housing. A sealing-means receptacle is formed on a boundary surface between the housing and the closure element. Furthermore, at least one first channel leads into the sealing-means receptacle and is open towards the surroundings of the actuating unit. A sealing element, which is arranged in the sealing-means receptacle is placed into the sealing-means receptacle via the first channel.

14 Claims, 4 Drawing Sheets

ELECTROMAGNETIC ACTUATING UNIT

This application is a 371 of PCT/EP2008/058667 filed Jul. 4, 2008, which in turn claims the priority of DE 10 2007 036 925.7 filed Aug. 4, 2007, the priority of both applications is hereby claimed and both applications are incorporated by reference herein.

FIELD OF THE INVENTION

The invention relates to an electromagnetic actuating unit for a hydraulic valve with a housing and with a closing element, the housing at least partially delimiting the electromagnetic actuating unit with respect to the surroundings, the closing element being arranged inside an introduction orifice of the housing, and a sealing-means receptacle being formed at an interface between the housing and the closing element. Furthermore, the invention relates to a method for producing an electromagnetic actuating unit of this type.

Hydraulic valves of this type, for example proportional directional valves or switching valves, are used, for example, in internal combustion engines and there, for example, for the activation of hydraulic camshaft adjustors or switchable cam followers. The hydraulic valves consist of an electromagnetic actuating unit and of a valve portion. The valve portion constitutes the hydraulic portion of the directional valve, at least one feed connection, at least one working connection and one tank connection being formed on this. By means of the electromagnetic actuating unit, specific connections of the valve portion can be connected hydraulically to one another in a directed manner and therefore the pressure medium streams can be steered.

A hydraulic valve of this type is disclosed, for example in DE 10 2004 025 969 A1. The hydraulic valve has a valve portion and an electromagnetic actuating unit.

The electromagnetic actuating unit of this hydraulic valve comprises, inside a housing, an upper and a lower magnetic pole (magnet yoke), a coil arranged on a coil former, and an armature.

The coil and the magnetic poles are arranged coaxially to one another inside the housing of the electromagnetic actuating unit. The magnetic poles are in this case arranged so as to be offset in the axial direction with respect to one another. The armature is arranged axially movably radially inside the magnetic poles. The armature, housing and magnetic poles form a flux path for the magnetic flux lines which are caused by the coil being supplied with current.

By supplying the coil with current, the armature is pushed in the direction of the lower magnetic pole, this movement being transmitted to a control piston of the valve portion by means of a tappet push rod attached to the armature.

The housing has, on the side facing away from the valve portion, an introduction orifice, into which the coil former is plugged. That region of the coil former which is arranged in the region of the introduction orifice serves as a closing element which closes the introduction orifice. The cylindrical outer surface area of the closing element is provided with a groove running around annularly, in which a sealing ring is arranged. The sealing ring has the task of preventing the infiltration of aggressive substances, for example splash water.

During mounting of the actuating unit, first the sealing ring is inserted into the annular groove of the closing element, and then the coil former is introduced into the introduction orifice. The sealing ring is designed, in cross-section, with an oversize, as compared with the extent of the groove.

In this embodiment, there is the risk that the sealing ring shears off when the coil former is being introduced into the introduction orifice, with the result that the sealing function of the sealing element is no longer ensured. Furthermore, the sealing faces on the housing and on the closing body have to be manufactured with high accuracy in a cost-intensive way. There is therefore the risk that aggressive media, for example oil or water, infiltrate from the surroundings between the housing and the closing element into the interior of the electromagnetic actuating unit and may damage the latter, for example may lead to short circuits.

SUMMARY OF THE INVENTION

The object on which the invention is based, therefore, is to avoid these outlined disadvantages and therefore to provide an electromagnetic actuating unit for a hydraulic valve, which actuating unit can be used, even in aggressive surroundings, in a permanently functionally reliable way. At the same time, high process reliability during the production of the actuating unit is to be ensured.

In terms of an electromagnetic actuating unit, the object is achieved, according to the invention, in that at least one first duct is provided, which both discharges into the sealing-means receptacle and is designed to be open to the surroundings of the actuating unit.

In an embodiment of the invention, there is provision whereby the introduction orifice has an essentially cylindrical inner surface area and the closing element has a corresponding outer surface area and whereby the sealing-means receptacle is formed on at least one of the two components and is designed as an annular groove.

In a refinement of the invention, the sealing-means receptacle may be designed as a clearance on the housing or on the closing element, an open side of the clearance being delimited by the other component. In this case, there may be provision for the clearance to be designed as a groove.

Advantageously, at least one second duct is provided, which both discharges into the sealing-means receptacle and is designed to be open to the surroundings of the actuating unit. In this case, there may be provision whereby the first duct, at a first position, and the second duct, at a second position, discharge into the sealing-means receptacle, the positions of discharge being selected in such a way that the shortest connecting line along the sealing-means receptacle, which line connects the positions of discharge, is designed to be maximum.

In an embodiment of the invention, the first duct is designed as an orifice in the housing or as a groove on the closing element or on the housing. There may likewise be provision for designing the second duct as an orifice in the housing or as a groove on the closing element or on the housing.

Furthermore, the actuating unit may have a sealing element which is arranged in the sealing-means receptacle and which extends into at least one of the ducts.

Advantageously, the sealing element is selected from a material from the group of silicones, polyurethanes, MS polymers, polysulfides or rubbers.

In this case, there may be provision for the sealing element to be enriched with a magnetically conductive filler. Fillers of this type may consist, for example, of metal, ferrites, alloys based on iron, nickel, silicon and cobalt and/or all steels which are suitable for magnetic parts which have sufficiently high permeability. In this case, the filler may be used, for example, in crystalline, amorphous or nanocrystalline form. In this case, the magnetically conductive filler has a magnetic susceptibility greater than zero, preferably greater than 1, especially preferably greater than 100.

Furthermore, the object is achieved by means of a method according to the preamble of claim 10, in that, after the closing element has been mounted in the introduction orifice of the housing, a sealing compound is introduced into the sealing-means receptacle via the first duct/via at least one of the first ducts.

Furthermore, there may be provision for the sealing compound to be cured after it has been introduced.

Advantageously, while the sealing compound is being introduced, the introduction pressure is monitored, and the introduction operation is terminated in the event of an abrupt rise in the introduction pressure.

Alternatively, the volume of sealing compound to be introduced may be monitored, the volume to be introduced corresponding to the volume of the sealing-means receptacle plus the volume of the ducts.

In a further alternative, there may be provision whereby at least one second duct, into which no sealing compound is introduced from outside the actuating unit, is monitored for the discharge of sealing compound, as a result of which the end of the filling operation is detected.

Electromagnetic actuating units of hydraulic valves serve for controlling the volume flows inside the associated valve portions. The electromagnetic actuating units have a housing in which an armature is guided linearly displaceably. The displacement of the armature is caused by a variation in a magnetic field which is generated, for example, by a coil arranged inside the housing and which magnetic field is routed within a magnetic circuit. The magnetic circuit usually consists of the housing and of one or more magnet yokes which are likewise arranged inside the housing. The movement of the armature is transmitted to a control piston of the valve portion and therefore the pressure medium streams inside the valve portion are regulated.

The housing has at least one introduction orifice, via which, during mounting, individual components of the actuating unit can be arranged at least partially inside the housing. In the mounted state, the introduction orifice is closed by means of a closing element. As a closing element, for example, a magnet yoke, a valve housing of the valve portion or a closing region of a coil holder may be considered. In this case, the closing element is designed in such a way that it closes the introduction orifice, with the exception of a gap at the interfaces. In order to prevent aggressive media from infiltrating into the interior of the housing, there is provision for arranging a sealing element at the interface between the housing and the closing element. For this purpose, a sealing-means receptacle for receiving a sealing means is provided either at the interface of the housing or of the closing element or at both interfaces.

In order to prevent the sealing element from being damaged or from shearing of during the mounting of the electromagnetic actuating unit, it is proposed to introduce this sealing element only after mounting. For this purpose, a duct is provided, which, starting from outside the actuating unit, runs to the sealing-means receptacle and discharges into this, so that the sealing-means receptacle communicates with the outside of the actuating unit via this duct. It is likewise conceivable to form a plurality of ducts of this type. A duct of this type may be formed, for example, by an orifice in the housing, a clearance, for example a longitudinal groove, in the coil holder, the housing or the magnet yoke or the like. It is likewise conceivable that the closing element or the housing has a stepped design in the region of the location to be sealed, thus giving rise to a gap which leads from the location to be sealed to the outside of the actuating unit. In this case, the sealing-means receptacle is located in the region of the step of the housing or of the closing element, and the duct corresponds to the outwardly open gap between these components.

The introduction orifice may be, for example, a circular orifice of a housing of essentially cylindrical design. In this orifice, during mounting, a likewise cylindrical region of a closing element, for example of a magnet yoke or of a coil holder, is positioned. The sealing-means receptacle may be designed, for example, as an annular groove in the outer surface area of the closing element or in the inner surface area of the housing, the open side of the annular groove being closed by the other component, with the exception of a small gap.

During the production of the electromagnetic actuating unit, there is provision whereby, after the closing element has been mounted in the introduction orifice of the housing, a sealing compound is introduced into the sealing-means receptacle via the duct. The sealing compound may be, for example, a liquid seal or a paste-like or gel-like material. The sealing compound may, for example, be injected or pressed into the duct. During the introduction of the sealing compound into the sealing-means receptacle, the air present there can escape into the surroundings via the gap between the housing and the closing element, thus ensuring a complete filling of the sealing-means receptacle. Alternatively, or additionally, a second duct may be provided, which, starting from outside the actuating unit, runs to the sealing-means receptacle and discharges into this, so that the sealing-means receptacle likewise communicates with the outside of the actuating unit via this duct. The air present inside the sealing-means receptacle can escape via this duct. Additionally, excess sealing material can be discharged, and this can be detected at the same time during the introduction of the sealing means and be used as a criterion for terminating the introduction operation.

Alternatively, the volume of sealing compound to be introduced may be monitored. In this case, there is provision for only a specific mass or a specific volume to be introduced. The mass to be introduced or the volume to be introduced is determined by the volume of the sealing-means receptacle and of the ducts.

In the event that only first ducts are provided, via which the sealing compound is introduced, the introduction pressure may be monitored during the introduction of the sealing compound. After the complete filling of the sealing-means receptacle, in this case an abrupt pressure rise is to be noted which may be used as a criterion for terminating the setting operation.

After the completion of the setting operation, there may be provision for the sealing compound to be cured. This may take place, for example, by the setting of suitable temperatures, the supply of oxygen, UV radiation or water (for example, atmospheric moisture, vapor in the case of moisture-crosslinking materials, such as, for example silicones, methyl cyanoacrylate). It is likewise conceivable to use a 2-component sealing compound which cures automatically after the filling of the sealing-means receptacle. It is likewise conceivable to employ anaerobically curing materials, in which the curing agent is inactive upon contact with oxygen. In this case, the sealing compound must be shielded from oxygen.

The actuating unit has, after the completion of mounting and of the introduction of sealing means, a sealing element which is arranged in the sealing-means receptacle and which extends at least into one of the ducts. In this case, the sealing element may consist, for example, of the group of silicones, polyurethanes, polysulfides, rubbers or silane-modified polymers (MS polymers).

The second duct may be positioned with respect to the first duct in such a way that the shortest path curve along the sealing-means receptacle between its positions of issue is maximum. In the case of sealing-means receptacles which are not closed on themselves, the first and the second duct advantageously discharge at the two ends of the sealing-means receptacle. In the case of annular or circular or other sealing-means receptacles closed on themselves, the region of discharge of the second duct is advantageously arranged in such a way that the path curves, starting from the position of discharge of the first duct, are of the same length along the two possible directions of travel.

Due to the subsequent insertion of the sealing means into the sealing-means receptacle after the positioning of the closing body inside the housing, the risk that the sealing means shears off during mounting is avoided. At the same time, the subsequent introduction of the sealing means into the sealing-means receptacle via filling ducts constitutes a method of high process reliability for the production of the actuating unit. The process reliability of the method and the sealing function of the sealing means are thus increased. At the same time, a simple way of implementing a magnetically conductive sealing element is shown.

BRIEF DESCRIPTION OF THE DRAWINGS

Further features of the invention may be gathered from the following description and from the drawings which illustrate an exemplary embodiment of the invention in simplified form and in which:

FIG. 2a shows a cross section through the first embodiment of a hydraulic valve during its production along the line II-II in FIG. 1a;

FIG. 3 shows a longitudinal section through a second embodiment of a hydraulic valve with an electromagnetic actuating unit according to the invention in the same sectional plane as in FIG. 1a.

DETAILED DESCRIPTION OF THE DRAWING

Figure 1A:
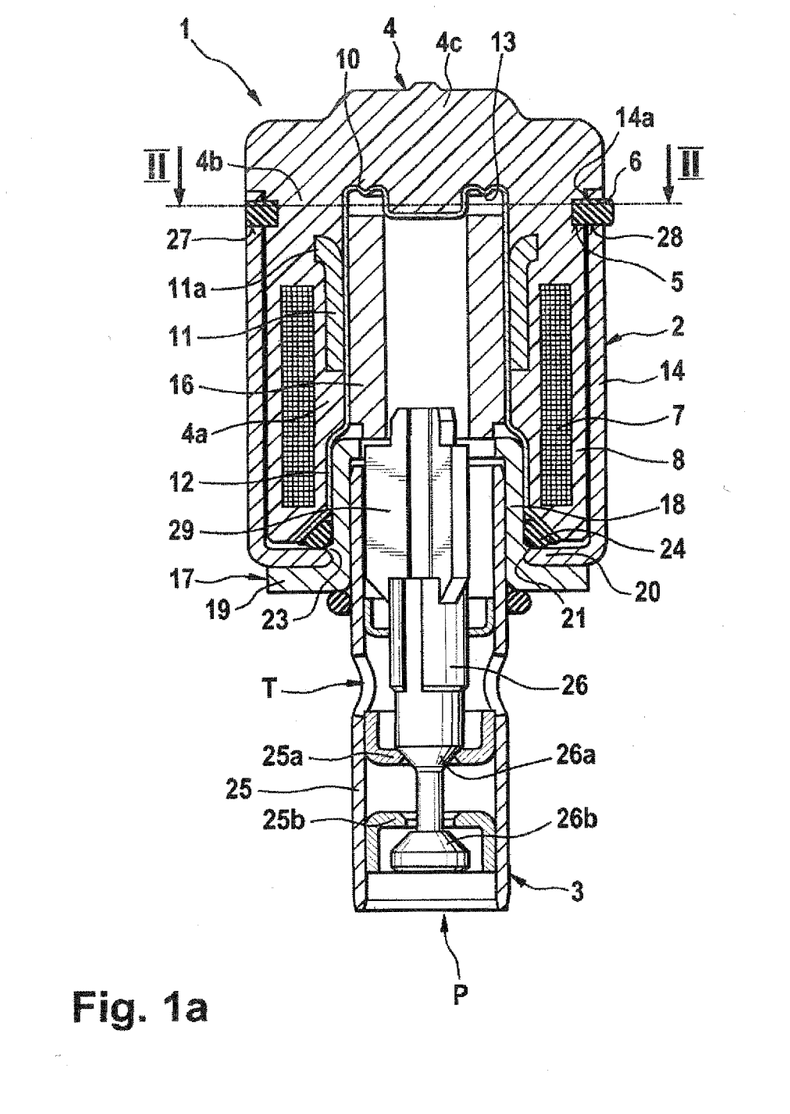
FIG. 1a shows a longitudinal section through a first embodiment of a hydraulic valve with an electromagnetic actuating unit according to the invention along the line IA-IA in FIG. 2b.
Figure 1B:
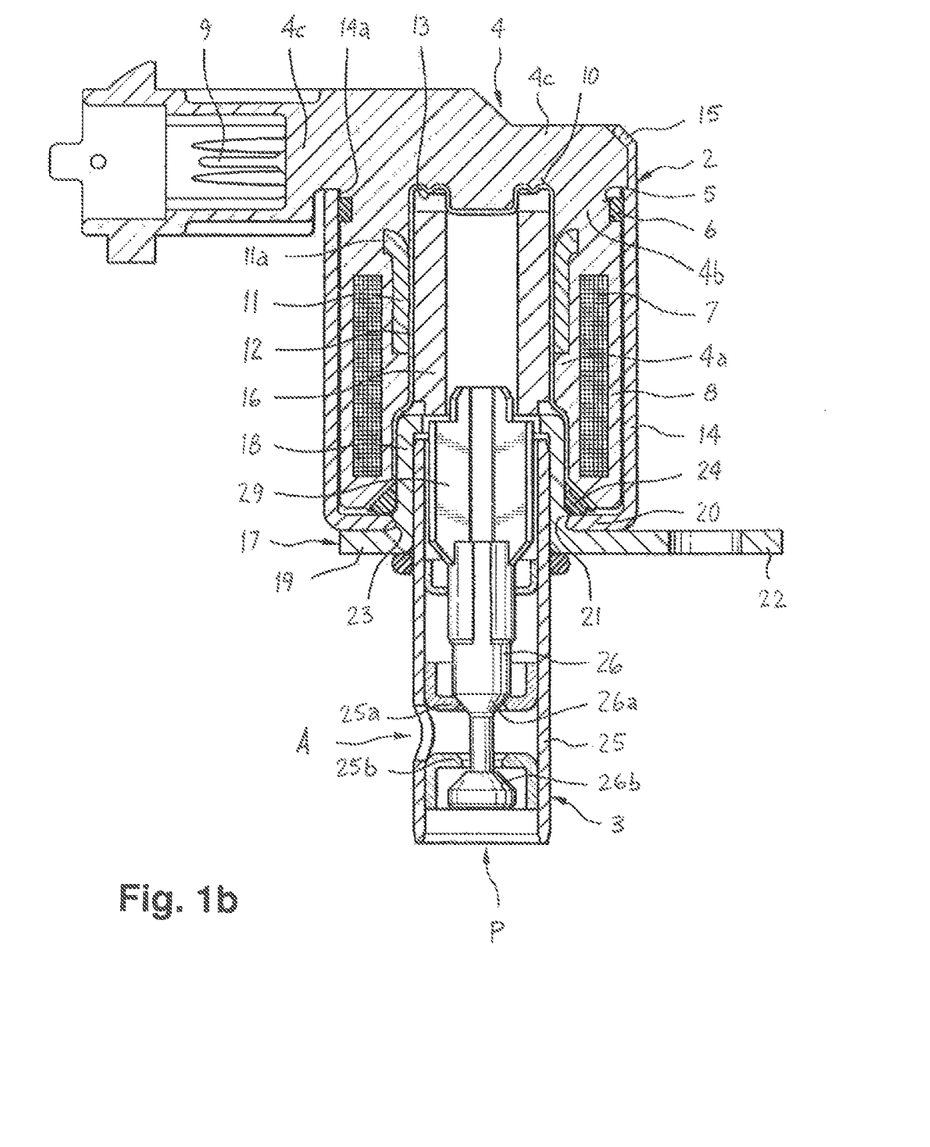
FIG. 1b shows a longitudinal section through the hydraulic valve from figure 1a along the line IB-IB in FIG. 2b.
Figure 3:
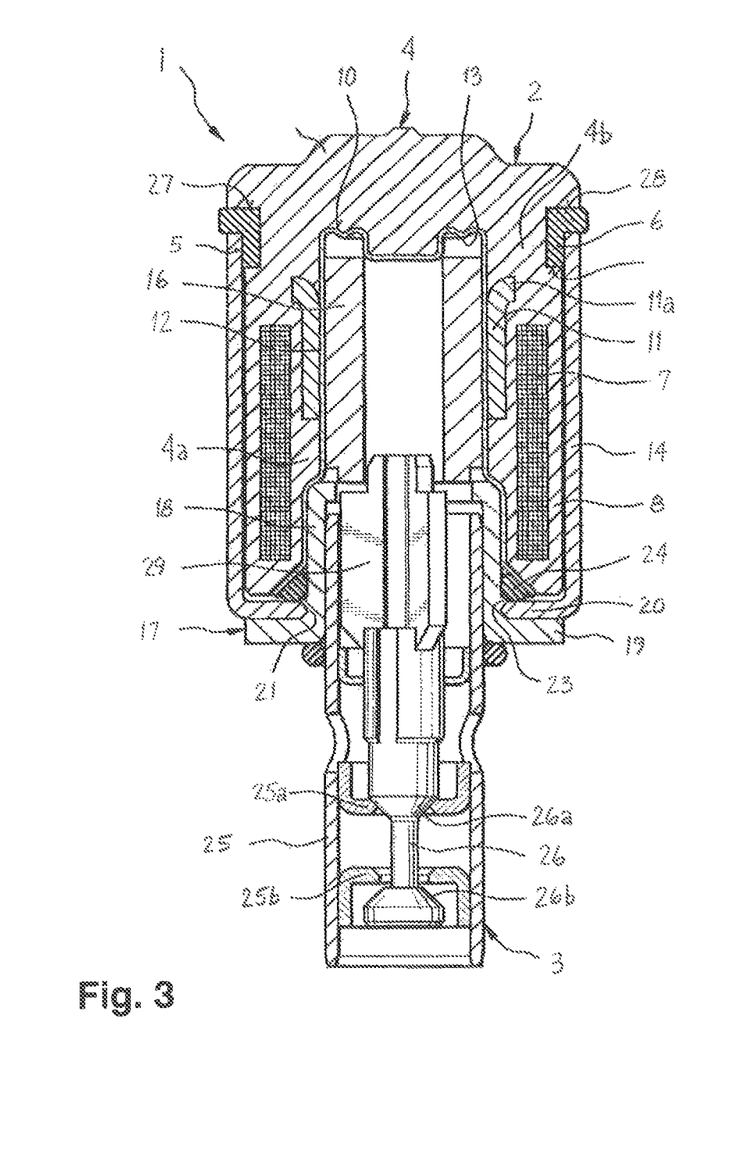

FIGS. 1 and 3 show embodiments of electromagnetic actuating units 2 according to the invention by the example of hydraulic valves 1 designed as a 3/2-way switching valve. Applications of the actuating unit 2 according to the invention in other switching valves or in other hydraulic valves 1, such as, for example, 4/3-way or 3/2-way proportional valves, may likewise be envisaged.

The hydraulic valve 1 has an electromagnetic actuating unit 2 and a valve portion 3.

In the camshaft adjustor application, the invention can be used both in plug-in valves, which are mounted separately from the camshaft adjustor, for example on the cylinder head or cylinder head cover, and in central valve applications. In central valve applications, the valve portion 3 is designed separately from the electromagnetic actuating unit 2 and is arranged coaxially to the camshaft or to an inner rotor of the camshaft adjustor. In this case, the actuating unit 2 is arranged axially to the valve portion 3 and is fastened, for example, to a cylinder head cover. The electromagnetic actuating unit 2 has a coil former 4. The coil former 4 is composed of a portion which serves as a coil holder 4a, of a portion which serves as a closing element 4b and of a portion which serves as a connection element 4c.

The coil holder 4a carries a coil 7 consisting of a plurality of turns of a suitable wire. The radially outer surface area of the coil 7 is surrounded by a sleeve-shaped material layer 8 which consists of a non-magnetizable material. The material layer 8 may, for example, consist of a suitable plastic and be injection-molded onto the wound coil 7.

Inside the connection element 4c, an electrical plug connection 9 is received, via which the coil 7 can be acted upon with current.

The coil former 4 is arranged at least partially inside a housing 14 of pot-shaped design. In the embodiment illustrated, the coil holder 4a and a part region of the closing element 4b are located inside the housing 14.

The housing 14 has a base 20, opposite which an introduction orifice 14a lies in the axial direction. During mounting, the coil former 4 can be introduced into the housing 14 via the introduction orifice 14a. In this embodiment, the closing element 4b assumes the task of preventing aggressive media from infiltrating into the interior of the actuating unit 2 via the introduction orifice 14a. For this purpose, the outside diameter of the closing element 4b is adapted essentially to the inside diameter of the housing 14. Alternatively to this, the outside diameter of the closing element 4b may be designed to be slightly smaller than the inside diameter of the housing 14, so that a small gap is present between these components.

At the introduction orifice 14a of the housing 14, tabs 15 are formed, which project beyond a shoulder of the closing element 4b in the axial direction and at least partially surround the latter in the radial direction. The coil former 4 is thus fixed firmly inside the housing 14.

The housing 14 may be manufactured, for example, by means of a cost-effective noncutting forming process, for example a deep-drawing method, from a suitable blank, for example a suitable sheet metal part.

The coil former 4 is designed with an essentially cylindrical blind-hole-like recess 10 which is formed concentrically to the coil 7. Further, the coil former 4 receives, at the bottom and of the recess 10, a first magnet yoke 11 of sleeve-shaped design. Inside the recess 10 is arranged a pot-shaped armature guide sleeve 12 which defines an armature space. The armature guide sleeve 12 extends in the axial direction along the entire recess 10 and at least partially surrounds the coil former 4 at its orifice in the radial direction.

An armature 16 is arranged displaceably in the axial direction inside the armature guide sleeve 12. The outside diameter of the armature 16 is adapted to the inside diameter of the armature guide sleeve 12, with the result that a mounting of the armature 16 in the armature guide sleeve 12 is implemented. The displacement travel of the armature 16 is limited in one direction by stops 13 and in the other direction by a second magnet yoke 17.

The second magnet yoke 17 has a tubular portion 18 and an annular portion 19 adjoining the latter in the axial direction. The tubular portion 18 extends through an orifice 21, formed in the base 20 of the housing 14, into the armature guide sleeve 12. In this case, the outside diameter of the tubular portion 18 is adapted to the diameter of the orifice 21.

The annular portion 19 has a mounting flange 22 which serves for fastening the hydraulic valve 1 to a surrounding structure, not illustrated, for example to a cylinder head cover.

The tubular portion 18 of the second magnet yoke 17 is connected fixedly to the housing 14 by means of a calking 23. Between the tubular portion 18 of the second magnet yoke 17 and the armature guide sleeve 12 a sealing ring 24 is arranged. This prevents lubricant present in the armature guide sleeve 12 from reaching the coil former 4, with the result that the latter is protected against damage caused by the lubricant.

The first magnet yoke 11 is provided, at the open end which faces away from the second magnet yoke 17, with a collar 11*a* extending in the radial direction.

A sealing-means receptacle 5 in the form of an annular groove is formed, above the collar 11*a*, on an outer surface area of the closing element 4*b*. The housing 14 is provided with a first and a second duct 27, 28 which, on the one hand, issue into the sealing-means receptacle 5 and, on the other hand, are designed to be open outwardly. Thus, before a sealing means is introduced, the sealing-means receptacle 5 communicates via each of the ducts 27, 28 with the space outside the housing 14 and consequently outside the actuating unit 2. In the illustrated embodiment, the ducts 27 are designed as an orifice or clearances in the housing 14 and lie diametrically opposite one another. In an alternative embodiment, there may be provision for only a first duct 27, but no second ducts 28, to be present.

A sealing element 6, which extends at the same time into the ducts 27, 28, is arranged in the sealing-means receptacle 5. The sealing element 6 fills the entire annular groove, the sealing material bearing, on the one hand, against the boundary faces of the annular groove and, on the other hand, against the inner surface area of the cylindrical housing 14. A sealing location between the housing 14 and the closing element 4*b* is thereby implemented, with the result that the infiltration of aggressive media into the interior of the actuating unit 2 is effectively prevented at this location.

By supplying current to the coil 7 becoming live, a magnetic field is generated inside the actuating unit 2, the magnetic flux lines running along a defined flux path. This flux path runs inside the first magnet yoke 11 in the axial direction, and at the axial end of the latter it follows the collar 11*a*. The magnetic flux lines pass from the collar 11*a* over into the housing 14 and inside of this are conducted in the axial direction, contrary to the flux direction inside the first magnet yoke 11, to the second magnet yoke 17. Inside the second magnet yoke 17, the flux lines pass in the direction of the armature 16, these passing over into the armature 16 via an air gap formed between the armature 16 and the second magnet yoke 17. The further flux path runs inside the armature 16 and is completed by passage through the armature guide sleeve 12 over into the first magnet yoke 11.

The valve portion 3 of the hydraulic valve 1 designed as a switching valve consists of a hollow-cylindrical valve housing 25 which has two valve seats 25*a, b*. A control piston 26 with two closing bodies 26*a, b*, is arranged inside the valve housing 25. The valve housing 25 is received inside the tubular portion 18 of the second magnet yoke 17 and has an end-face pressure connection P, a tank connection T and a working connection A. The tank connection T and the working connection A are designed as radial orifices in the cylindrical surface area of the valve housing 25. A first valve seat 25*a* is arranged between the tank connection T and the working connection A and a second valve seat 25*b* is arranged between the pressure connection P and the working connection A.

The control piston 26 has a conical closing body 26*a* on that side of the first valve seat 25*a* which faces away from the working connection A. Furthermore, a second closing body 26*b* is arranged on that side of the second valve seat 25*b* which faces away from the first valve seat 25*a*. The armature-side end of the control piston 26 is connected firmly to the armature 16 by means of a tappet push rod 29, so that the control piston 26 moves together with the armature 16 in the axial direction. By means of the position of the control piston 26 and therefore by the coil 7 being supplied with current in a suitable way, the working connection A can be connected selectively to the tank connection T or to the pressure connection P.

When the hydraulic valve 1 is being mounted, first the second magnet yoke 17 is positioned in the orifice 21 of the base 20 of the housing 14. Subsequently, these two components are connected to one another by means of a calking operation. In a further step, the sealing ring 24 is led through the introduction orifice 14*a* to the base 20, the armature 16 is positioned in the coil former 4, and the coil former 4 together with the armature 16 is introduced into the introduction orifice 14*a* of the housing 14. Subsequently, the outer regions of the tabs 15 are bent over in the radial direction and the coil former 4 is thus fixed inside the housing 14.

Figure 2A:
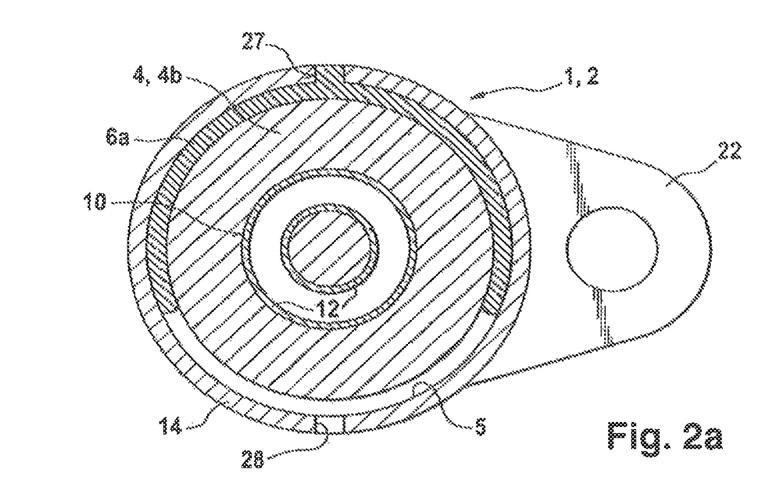

Thereafter, the sealing element 6 is positioned in the sealing-means receptacle 5. For this purpose, a sealing compound 6*a*, for example in the form of a liquid seal or gel-like or paste-like compound, is introduced into the sealing-means receptacle 5 via the first duct 27. FIG. 2*a* shows the actuating unit 2 during a method step in which the sealing-means receptacle 5 is not yet filled completely with the sealing compound 6*a*. When the sealing compound 6*a* is being introduced into the sealing-means receptacle 5, the air present in the sealing-means receptacle 5 can escape via a gap between the housing 14 and the closing element 4*b* and via the second duct 28.

During the introduction of the sealing compound 6*a* into the sealing-means receptacle 5, for example, the second duct 28, into which no sealing compound 6*a* is introduced from outside, may be monitored for the discharge of sealing compound 6*a*. This may be detected as a criterion for terminating the filling operation.

Alternatively, the volume to be introduced or mass to be introduced of the sealing compound 6*a* may be monitored, the volume to be introduced or the mass to be introduced corresponding to the volume of the sealing-means receptacle 5 plus the volume of the ducts 27, 28.

Alternatively, the introduction pressure of the sealing compound 6*a* may be monitored and an abrupt rise in the introduction pressure may be used as a criterion for discontinuing the filling operation. This method is suitable especially for embodiments which have only one or a plurality of first ducts 27 (filling ducts), but no second ducts 28 (discharge ducts).

Figure 2B:
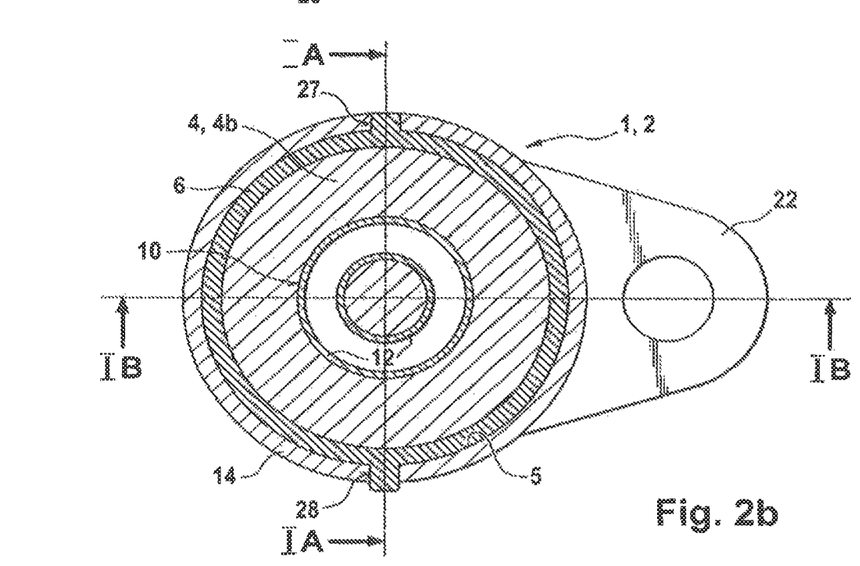
FIG. 2b shows a cross section similar to FIG. 2a after the completion of the hydraulic valve.

FIG. 2*b* shows an actuating unit 2 according to the invention after the termination of the filling operation. The entire sealing-means receptacle 5 and the first and the second duct 27, 28 are filled completely with the sealing compound 6*a*.

After the sealing-means receptacle 5 has been filled with the sealing compound 6*a*, this is followed by a further method step in which the sealing compound 6*a* is cured. This may be achieved, for example, by means of thermal action, UV radiation, oxygen shielding or the supply of oxygen or of water. Alternatively, there may also be provision for using a two-component sealing compound 6*a* which cures automatically upon intermixing.

The sealing compound 6*a* may be selected, for example, from the group of silicones, polyurethanes, polysulfides, MS polymers or rubbers. In an advantageous development, the sealing compound 6*a* has high magnetic conductivity/magnetizability. This may be achieved in that a magnetically conductive filler, for example particles, are mixed into the sealing compound 6*a*. Fillers of this type may consist, for example, of metal, ferrites, alloys based on iron, nickel, silicon and cobalt and/or all steels which are suitable for magnetic parts and which have sufficiently high permeability. The filler may be used, for example, in crystalline, amorphous or nanocrystalline form. In this case, the magnetically conductive filler has a magnetic susceptibility greater than zero, preferably greater than 1, especially preferably greater than 100. In this case, the sealing element 6 may be arranged level with the collar 11a of the first magnet yoke 11, with the result that there is a reduction in the axial construction space requirement of the actuating unit 2. Owing to the use of a sealing element 6 with high magnetic conductivity/magnetizability in the flux path of the magnetic flux lines, a flux path is made available to the magnetic flux lines at the transition from the collar 11a to the housing 14. As a result, the stray field at this location is minimized, as compared with conventional (diamagnetic) sealing elements, and therefore a high conversion of the magnetic field generated by the coil current into an axial displacement of the control piston 26 is achieved.

FIG. 3 illustrates a second embodiment of an actuating unit 2 according to the invention. In contrast to the first embodiment which is illustrated in FIGS. 1a to 2b, the ducts 27, 28 are designed as clearances in the closing element 4b. These consist in each case of a longitudinal groove extending from the sealing-means receptacle 5, designed as an annular groove, in the axial direction along an inner surface area of the housing 14. Above this wall, the clearance extends outward in a radial direction. Alternatively, the longitudinal groove may also be formed in the housing 14. With the exception of the design of the ducts 27, 28, the actuating units 2 of the first and the second embodiment and their production methods are identical.

The use of the method according to the invention is not restricted to the position, shown in the exemplary embodiments, of the sealing-means receptacle 5 or of the sealing means 6. Rather, the method may be employed for sealing any location of the actuating unit 2. It would be conceivable, for example, to replace the sealing ring 24 by an injected seal (similar to sealing element 6). For this purpose, ducts 27, 28 could be formed in the surface area of the tubular portion 18 of the second magnet yoke 17, level with the location to be sealed.

REFERENCE SYMBOLS

1 Hydraulic valve
2 Actuating unit
3 Valve portion
4 Coil former
4a Coil holder
4b Closing element
4c Connection element
5 Sealing-means receptacle
6 Sealing element
6a Sealing compound
7 Coil
8 Material layer
9 Plug connection
10 Recess
11 First magnet yoke
11a Collar
12 Armature guide sleeve
13 Stop
14 Housing
14a Introduction orifice
15 Tab
16 Armature
17 Second magnet yoke
18 Tubular portion
19 Annular portion
20 Base
21 Orifice
22 Mounting flange
23 Calking
24 Sealing ring
25 Valve housing
25a, b Valve seat
26 Control piston
26a, b Closing body
27 First duct
28 Second duct
29 Tappet push rod
P Inflow connection
T Tank connection
A First working connection

The invention claimed is:

1. An electromagnetic actuating unit for a hydraulic valve, comprising:
 a housing; and a closing element,
 the housing at least partially delimiting the electromagnetic actuating unit with respect to surroundings,
 the closing element being arranged inside an introduction orifice of the housing; and
 a sealing-means receptacle being formed at an interface between the housing and the closing element,
 the sealing-means receptacle being an annular groove,
 wherein at least one first duct is provided, which both discharges into the sealing-means receptacle and is designed to be open to the surroundings of the actuating unit, and
 wherein at least one second duct is provided, which both discharges into the sealing-means receptacle and is designed to be open to the surroundings of the actuating unit.

2. The electromagnetic actuating unit of claim 1, wherein the introduction orifice has an essentially cylindrical inner surface area and the closing element has a corresponding outer surface area, and the sealing-means receptacle is formed on at least one of the two components and is designed as an annular groove.

3. The electromagnetic actuating unit of claim 1, wherein the annular groove is disposed on the housing or on the closing element, an open side of the annular groove being delimited by the other component.

4. The electromagnetic actuating unit of claim 1, wherein the first duct, at a first position, and the second duct, at a second position, discharge into the sealing-means receptacle, the first position and the second position being selected in such a way that a distance along the sealing-means receptacle that connects the first position and the second position is designed to be maximum.

5. The electromagnetic actuating unit of claim 1, wherein the first duct is designed as an orifice in the housing or as a groove on the closing element or on the housing.

6. The electromagnetic actuating unit of claim 1, wherein the second duct is designed as an orifice in the housing or as a groove on the closing element or on the housing.

7. The electromagnetic actuating unit of claim 1, wherein a sealing element, which extends into at least one of the first duct or the second duct, is arranged in the sealing-means receptacle.

8. The electromagnetic actuating unit of claim 7, wherein the sealing element is selected from a material from the group of silicones, polyurethanes, MS polymers, polysulfides or rubbers.

9. The electromagnetic actuating unit of claim 7, wherein the sealing element is enriched with a magnetically conductive filler.

10. A method for producing an electromagnetic actuating unit, comprising a housing; and a closing element, the housing at least partially delimiting the electromagnetic actuating unit with respect to surroundings, the closing element being arranged inside an introduction orifice of the housing; and a sealing-means receptacle being formed at an interface between the housing and the closing element, the sealing-means receptacle being an annular groove, wherein at least one first duct is provided, which both discharges into the sealing-means receptacle and is designed to be open to the surroundings of the actuating unit; wherein the method comprises after the closing element has been mounted in the introduction orifice of the housing, a sealing compound is introduced into the sealing-means receptacle via the at least one first duct.

11. The method of claim 10, wherein the sealing compound is cured after the sealing compound has been introduced.

12. The method of claim 10, wherein, while the sealing compound is being introduced, introduction pressure is monitored, and introduction operation is terminated in an event of an abrupt rise in the introduction pressure.

13. The method of claim 10, wherein a volume of sealing compound to be introduced is monitored, the volume to be introduced corresponding to a volume of the sealing-means receptacle plus a volume of the first duct and a second duct.

14. The method of claim 10, wherein at least one second duct, into which no sealing compound is introduced from outside the actuating unit, is monitored for an discharge of the sealing compound, as a result of which an end of a filling operation is detected.

* * * * *